US012032966B2

(12) United States Patent
Davis et al.

(10) Patent No.: US 12,032,966 B2
(45) Date of Patent: Jul. 9, 2024

(54) REDUCING OVERHEAD IN PROCESSOR ARRAY SEARCHING (71) Applicant: Texas Instruments Incorporated, Dallas, TX (US)

(72) Inventors: Alan Davis, Sugar Land, TX (US); Venkatesh Natarajan, Bangalore (IN); Alexander Tessarolo, Lindfield (AU)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/958,219

(22) Filed: Sep. 30, 2022

(65) Prior Publication Data
US 2024/0111541 A1 Apr. 4, 2024

(51) Int. Cl.
*G06F 9/38* (2018.01)
*G06F 7/02* (2006.01)

(52) U.S. Cl.
CPC .............. *G06F 9/3869* (2013.01); *G06F 7/02* (2013.01)

(58) Field of Classification Search
None
See application file for complete search history.

(56) References Cited

U.S. PATENT DOCUMENTS

| 2012/0215752 A1* | 8/2012 | Parkkinen | G06F 16/22 |
| | | | 707/705 |
| 2013/0166516 A1 | 1/2013 | Trott et al. | |
| 2016/0140243 A1* | 5/2016 | Adams | G06F 16/9535 |
| | | | 707/706 |
| 2017/0249392 A1* | 8/2017 | Portnoy | G06F 16/958 |
| 2019/0042190 A1 | 2/2019 | Vicente et al. | |
| 2019/0220735 A1* | 7/2019 | Sengupta | G06N 3/047 |

OTHER PUBLICATIONS

Tavangarian, D., Flag-Oriented Parallel Associative Architectures and Applications, 1994, IEEE, pp. 41-52. (Year: 1994).*
International Search Report in corresponding PCT Application No. PCT/US2023/074986, mailed Jan. 22, 2024.

* cited by examiner

*Primary Examiner* — Eric Coleman
(74) *Attorney, Agent, or Firm* — Brian D. Graham; Frank D. Cimino (57) ABSTRACT

A processor with instruction storage configured to store processor instructions, data storage configured to store processor data representing an array, the array including plural data elements, a controller, and an instruction pipeline. The instruction pipeline includes: a load stage circuit configured to load an array element from the data storage, a compare stage circuit configured to compare the array element to a reference value, a store stage circuit configured to store a set of results that includes a result of the comparison of the array element to the reference value, and a loop hit detect stage circuit configured to determine whether any of the set of results is associated with a hit on the reference value.

20 Claims, 10 Drawing Sheets

FIG. 3A
(REF=30)

FIG. 3B
(REF=30)

FIG. 3C
(REF=30)

| CLOCK CYCLE | | | | |
|---|---|---|---|---|
| 0 | LOAD A[0] | | | |
| 1 | COMPARE A[0],REF | LOAD A[1] | | |
| 2 | STORE_COMP_HIS | COMPARE A[1],REF | LOAD A[2] | |
| 3 | LOAD A[3] | STORE_COMP_HIS | COMPARE A[2],REF | |
| 4 | COMPARE A[3],REF | LOAD A[4] | STORE_COMP_HIS | |
| 5 | STORE_COMP_HIS | COMPARE A[4],REF | LOAD A[5] | LOOP DECISION |
| 6 | LOAD A[6] | STORE_COMP_HIS | COMPARE A[5],REF | |
| 7 | COMPARE A[6],REF | LOAD A[7] | STORE_COMP_HIS | |
| 8 | STORE_COMP_HIS | COMPARE A[7],REF | LOAD A[8] | LOOP DECISION |
| 9 | LOAD A[9] | STORE_COMP_HIS | COMPARE A[8],REF | |
| 10 | COMPARE A[9],REF | LOAD A[10] | STORE_COMP_HIS | |
| 11 | STORE_COMP_HIS | COMPARE A[10],REF | LOAD A[11] | LOOP DECISION |
| 12 | | STORE_COMP_HIS | COMPARE A[11],REF | |
| 13 | | | STORE_COMP_HIS | |
| 14 | | | | LOOP DECISION |
| | 0, 3, 6, 9 | 1, 4, 7, 10 | 2, 5, 8, 11 | 0-2, 3-5, 6-8, 9-11 |

INSTRUCTION SEQUENCE

FIG. 5
(REF=30)

|  | HIS_FLAG{*mse,lse*} | LOOP DECISION HIT_INDEX |
|---|---|---|
| A[1], A[0] | 16, 65 | 00 | 1 |
| A[3], A[2] | 62, 83 | 00 | 3 |
| A[5], A[4] | 30, 29 | 10 | 5 |

FIG. 7
(REF=30)

| CLOCK CYCLE | | | |
|---|---|---|---|
| 0 | LOAD A[3-0] | | |
| 1 | COMPARE: A[3-0],REF | LOAD A[7-4] | |
| 2 | STORE_COMP_HIS | COMPARE A[7-4],REF | LOAD A[11-8] |
| 3 | LOAD A[15-12] | STORE_COMP_HIS | COMPARE A[11-8],REF |
| 4 | COMPARE A[15-12],REF | LOAD A[19-16] | STORE_COMP_HIS |
| 5 | STORE_COMP_HIS | COMPARE A[19-16],REF | LOAD A[23-20] |
| 6 | LOAD A[27-24] | STORE_COMP_HIS | COMPARE A[23-20],REF |
| 7 | COMPARE A[27-24],REF | LOAD A[31-28] | STORE_COMP_HIS |
| 8 | STORE_COMP_HIS | COMPARE A[31-28],REF | LOAD A[35-32] |
| 9 | | STORE_COMP_HIS | COMPARE A[35-32],REF |
| 10 | | | STORE_COMP_HIS |
| 11 | | | |

| | | | |
|---|---|---|---|
| 0, 3, 6 | 1, 4, 7 | 2, 5, 8 | 0-2, 3-5, 6-8 |

INSTRUCTION SEQUENCE

FIG. 9
(REF=30)

FIG. 10

REDUCING OVERHEAD IN PROCESSOR ARRAY SEARCHING

CROSS-REFERENCE TO RELATED APPLICATION

Not applicable.

BACKGROUND

The described examples relate to electronic processors and more particularly to improving either hardware or processor performance, for example in reducing overhead, in processor array searching.

Computational programming and processing often require searching for a value in an array, typically by comparing a predetermined value with each element in the array. Once a search match (hit) occurs, often the location (index) of the matching array element is returned or stored, usually for a subsequent action. Alternatively, the search may complete upon merely identifying that the searched-for element is somewhere in the array. Searching may be performed in various forms, with examples including linear (sequential) and interval (e.g., binary) searching. Data array value searching may be used in numerous applications, for example including numeric data processing and image/speech processing.

A processor architecture may be programmed with a higher level language to search for an element in an array, and that programming is compiled into some lower language level instructions (object code) that are processed at the machine level instructions through a processor pipeline. Generally, the lower language level instructions include three functions: (i) first loading one or more instructions and operands, the operands including a searched-for value and an array element; (ii) second executing an instruction to compare the searched-for value with an array element; and (iii) responding to the search result, such that if a comparison mis-match (miss) occurs, branch control causes the flow to loop and repeat the three functions for a next array element, whereas if there is a comparison match (hit), branch controls ends the search sequence, and any looping, and takes a next action with the search having completed. Accordingly, when a miss occurs and the branch requires a repeat or loop of those same steps, the resource penalty incurred is sometimes referred to as loop overhead, which may include repeated loops until the search is complete. Further, in many contemporary processors (e.g., reduced instruction set computer, and variations thereof), the processor includes a pipeline design with multiple stages, often involving instruction fetching, operand read(s), execution, and writeback. As successive instructions pass through the pipeline, often the efficiency of processing a later instruction in a sequence depends on the processing of an earlier instruction in the sequence, for example stalls, pipeline flushing, branch prediction, and otherwise managing pipeline artifacts. The depth of the pipeline, meaning its number of stages, creates pipelining overhead. Accordingly, array searching can be resource intensive in terms of both loop overhead and pipelining overhead. Examples are provided in this document that may improve on various of the above considerations as well as other concepts, as further detailed below.

SUMMARY

In one example, there is a processor, comprising instruction storage configured to store processor instructions; data storage configured to store processor data representing an array, the array including plural data elements; a controller; and an instruction pipeline. The instruction pipeline includes: a load stage circuit configured to load an array element from the data storage; a compare stage circuit configured to compare the array element to a reference value; a store stage circuit configured to store a set of results that includes a result of the comparison of the array element to the reference value; and a loop hit detect stage circuit configured to determine whether any of the set of results is associated with a hit on the reference value.

Other aspects are also disclosed and claimed.

DETAILED DESCRIPTION

Figure 1:
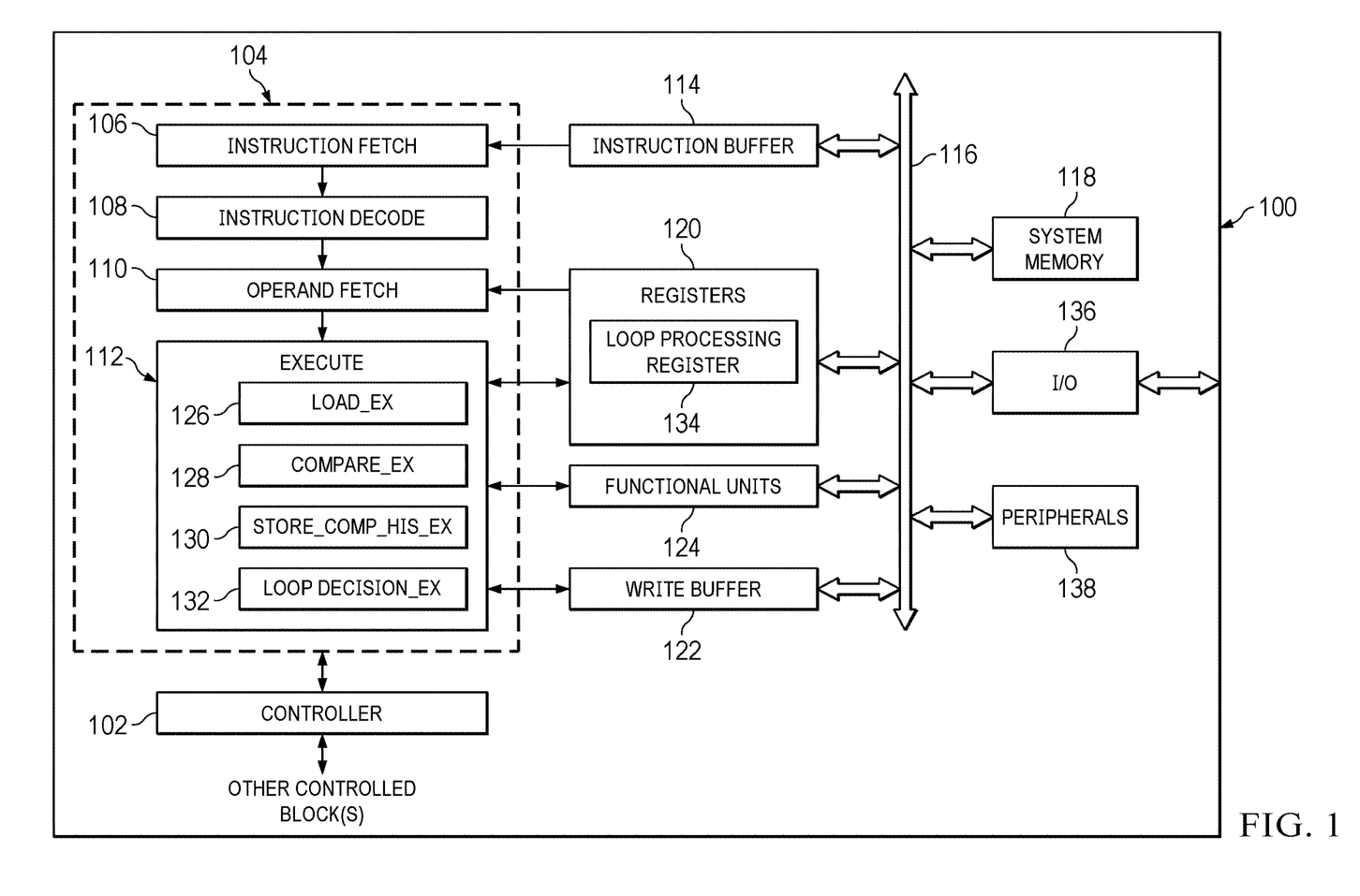
FIG. 1 is a block diagram of a processor.

FIG. 1 is an example block diagram of a processor 100 including structure and operable to perform array searching. The processor 100 may take various forms, such as a general purpose microprocessor, an application specific processor, a digital signal processor, a microcontroller, or the like. The processor 100 includes a controller 102, which may be coupled to control various other blocks of the processor 100, including at least one instruction pipeline 104. The instruction pipeline 104 represents control logic that manages the operation flow and interaction with various operational blocks, and it includes a number of different stages, which are logically characterized by functionality associated with each stage, as an instruction is processed through the respective stage. Each of the stages has some form of physical circuit representation, for example as control logic to accomplish the stage functionality, either alone or in conjunction with other illustrated blocks (or understood blocks that are not separately shown). By example, the stages include a number of specialized integrated circuits, including: an instruction fetch stage 106, an instruction decode stage 108, an operand fetch stage 110, and an execute stage 112. Conceptually, the stages are generally sequential, and each occurs in a separate clock cycle (or plural cycles), with the functionally occurring in hardware for the stage, or in combination with other block(s) of the processor 100. The functionality/timing of one stage, however, may overlap with another, and each stage may be further subdivided either physically or operationally, in different architectures and different processor models. Accordingly, the discussion of the instruction pipeline 104 in general is not intended to be limiting, as concepts described and claimed in this document may be implemented in a variety of pipelined processors.

The instruction fetch stage 106 is coupled to an instruction buffer 114, and it fetches one or more instructions at a time from the instruction buffer 114. The instruction buffer 114 is coupled to a system bus 116, and it temporarily stores instructions received by it from the system bus 116. The system bus is 116 coupled to various blocks, including a system memory 118, from where the instructions are transferred to the system bus 116. The system memory 118 or may include one or more levels of cache memory. The transfer of instructions from the system memory 118 to the instruction buffer 114, via the system bus 116, may be under operation of the controller 102, which can include dedicated structure to attend to such instruction transfer, such as a direct memory access (DMA) controller. Accordingly, through these various structures and paths, the system memory 118 serves as a processor (or computer) readable storage medium, in which instructions are stored and then are readable for execution by the processor 100. Each fetched instruction is in a format compatible with the specifications of the processor 100, for example representing object code level instructions that result from compiling higher level language programming instructions. In one example, the code may be provided directly to the processor 100 in object code form (and compiled elsewhere, such as on a general purpose computer). In the context of the present examples, the higher level language programming instructions include an array-search instruction, or instructions, intended to cause a search of an array to determine if a reference value matches any element within the array, and optionally also identifying the location (index) within the array where a match, if any, is identified. Accordingly, unless stated otherwise, it should be understood that instructions at the levels discussed hereafter are those object code instructions resulting from compiling of such higher level array-search instruction(s).

The instruction decode stage 108 receives instructions, one or more at a time, and then decodes them according to the binary state and position of the bits in each instruction. Generally, an instruction may include one or more fields, for example an instruction opcode that indicates that function of the instruction, and one or more operands, which are either directly acted upon, or indicate a location of something to be acted upon, by operation of the instruction. More than one instruction may be decoded at a time. For example, a very long instruction word (VLIW) architecture may include some form of instruction parallelism, where more than one instruction can be processed by one or more of the pipeline 104 stages, including the instruction decode stage 108. The VLIW may be formatted, for example, as one large instruction or as a fixed instruction packet. In any event, the program may explicitly provide plural instructions at a same time, where the instructions can be decoded and subsequent steps may be concurrently taken, provided there is not a dependency among the instructions that prevents one or more from being concurrently executed or otherwise taken out of order.

The operand fetch stage 110 is controlled, based on the instruction function(s) identified by the instruction decode stage 108, to read a value or values for use in subsequent execution of the respective instruction, where such value retrieval is known as a fetch either from a register or a data memory element. The fetched values may represent data, for example one or more data elements in an array to be searched. Typically, the values read are from a nearby and fast data store, such as a block of registers 120. The registers 120 also may be coupled to the system bus 116, with values also provided between the registers 120 and the system memory 118, via the system bus 116. Accordingly, the fetched values may be immediate register values in the registers 120, for example already valid within a register from execution of a previous instruction, or may be transferred from a storage location in the system memory 118. Again, to the extent that the processor 100 supports parallelism, then the operand fetch stage 110 may concurrently fetch plural values, for example corresponding respectively, to plural instructions to be executed.

The execute stage 112 executes the instruction(s), and to the extent the instruction execution provides a data result, that result is written to the appropriate target destination, for example in the registers 120 or to a write buffer 122, which is also coupled to the system bus 116. Execution by the execute stage 112 is typically achieved in conjunction with additional circuitry beyond simply the control logic of the stage, including for example dedicated functional units 124, each operable to perform certain types of operations based on the unit (e.g., integer operations, floating point operations, video processing, etc.). As described later, in the present example, the execute stage 112 also includes additional structure and/or functionality that execute to provide and complete concurrent operations toward an array search function, including a LOAD_EX stage 126 for loading an array element, a COMPARE_EX stage 128 for comparing the loaded array element, to a reference value, a STORE_COMP_HIS_EX stage 130 for storing/aggregating a history of each comparison as the array is processed, and a LOOP DECISION_EX stage 132 for periodically reviewing the history and determining from that history a subsequent action, for example, either continuing the search function or concluding it. The stored history, and results of the periodic review, may be indicated in a register(s) of the registers 120, so for sake of illustration an additional loop processing register 134 is shown as part of the registers 120. Of course, the execute stage 112 and functional units 124 may include and provide myriad other structure and functionality, such as associated with traditional or to-be-developed processor architectures. In any event, as the execution stage 112 executes its respective instruction toward some result, the result can be represented by a value written into the write buffer 122, from where that value may be further read or transferred, for example via the system bus 116 to some other destination.

The processor 100 also may include other structures and functionality. For example, FIG. 1 includes certain such items, including an input/output (I/O) block 136 and peripherals 138. The I/O block 136 may couple to the system bus 116 and provide an interface (not expressly shown) to other device(s) external from the processor 100, so as to facilitate communication between I/O block 136 (and the system bus 116) and such devices. The peripherals 138 may be of various forms known in the art. Other structure and functionality, for example as existing or as developed in the art, also may be included but are not shown for simplification. For example, in a secure processor architecture, additional safety and/or security structure may be included between the system bus 116 and the physical layer interface, such as the I/O block 136 interface to external connectivity, or even to the system memory 118 and the peripherals 138. Still other structure is contemplated and will be ascertainable by one skilled in the art.

For example, consider the higher level programming pseudo code in the following Table 1:

TABLE 1

| Instruction sequence number | Instruction |
|---|---|
| INS0 | FOR i = 0, N |
| INS1 | COMPARE REF, ARRAY[i] |
| INS2 | IF MISS |
| INS3 | i = i + 1 |
| INS4 | GOTO INS1 |
| INS5 | ELSE, IF HIT, STORE i and SET HIT_FLAG |

Generally, the pseudocode of Table 1 is intended to illustrate an example loop that compares a reference value, REF, to each value in an array, ARRAY, having a total of N+1 elements. The comparison, illustrated by the pseudocode and as performed by corresponding object code in the processor 100, conditionally loops through an index [i], from an index of [i=0] up to [i=N], as controlled by initialization at INS0 and various conditional instructions, along with advancement of the index by INS3. Accordingly, the collective code compares an ARRAY value, at one index [i] at a time, either until a comparison hit is found, after which the index [i] from the hit is stored and a flag, HIT FLAG, is set, or, upon each miss the loop evaluates the next ARRAY value, at an incremented index [i], until each element in the entire ARRAY is compared to REF.

In some alternative architectures, the Table 1 pseudocode typically requires, until a hit is found, a number N of clock cycles for each loop iteration. Each such iteration includes at least a load, a compare, and then a branch decision based on the result of the compare, so N represents the total number of clock cycles to achieve these steps for a given iteration. Generally, for each compare miss, the branch decision repeats the loop, so the N clock cycles repeat. Accordingly, for an array search with a total of M misses, and with the resulting looping, then at least M*N clock cycles are expended to complete the array search. In other words, the loop overhead is essentially compounded for each miss, so for searching a relatively large number of elements, the loop overhead penalty can be considerable. In contrast, the processor 100 implements structure and functionality to considerably reduce such overhead, as detailed below.

Figure 2:
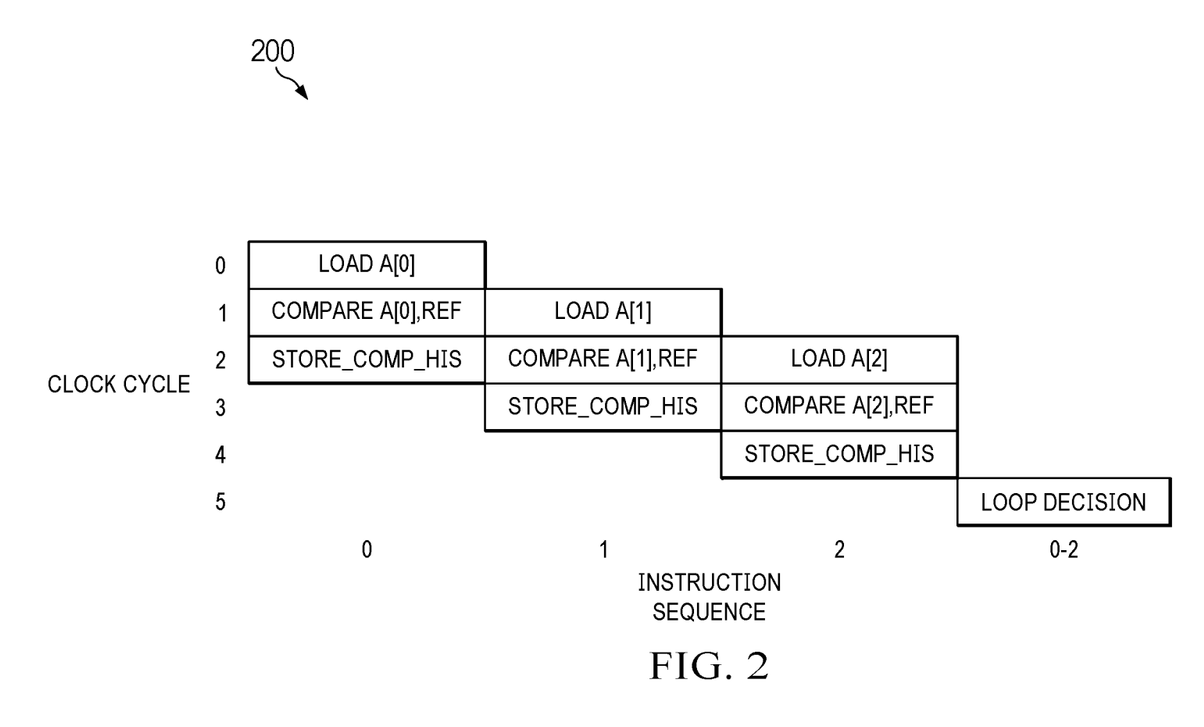
FIG. 2 illustrates an instruction progression implemented by object code in the FIG. 1 processor.

FIG. 2 illustrates an instruction progression 200, as implemented by object code in the FIG. 1 processor 100 and for achieving the functionality corresponding to the Table 1 pseudocode. The FIG. 2 illustration provides a first example, and it also introduces and simplifies additional examples provided later. In FIG. 2 and in contrast to later examples, the LOAD_EX stage 126, of the execute stage 112, supports a single compare operation per clock cycle, while other portions of the execute stage 112 can execute other functions at a same time as the compare. In FIG. 2, the vertical axis shows successive clock cycles (downward), with an example process spanning a total of six clock cycles, numbered 0 through 5. Further, the FIG. 2 horizontal axis shows the sequence to which a particular executing instruction belongs. In a first example, the FIG. 2 first row indicates a clock cycle 0, during which only a single instruction, LOAD A[0] from an instruction sequence 0, is executed by the LOAD_EX stage 126 and loads the first array element into a register. In a second example, the FIG. 2 second row indicates a clock cycle 1, during which two instructions are executed, namely, for the instruction sequence 0, the COMPARE A[0], REF is executed by the COMPARE_EX stage 128 and compares the register value loaded in clock cycle 0 to a reference value, REF, that may be previously stored in a separate register, while also in the same clock cycle 1, for an instruction sequence 1, an additional load executes by the LOAD_EX stage 126, as shown as LOAD A[1], to load the next ARRAY element into a register. The load instruction may be initiated earlier in the instruction pipeline 104, for example as part of the operand fetch stage 110, but it completes in the LOAD_EX stage 126, and separate from other stages, such as from the COMPARE_EX stage 128. Accordingly, during the clock cycle 1, a portion of two different instruction sequences 0 and 1 concurrently execute, one in the LOAD_EX stage 126 and another in the COMPARE_EX stage 128. The remaining examples will be further understood below.

While the totality of the FIG. 2 example compares three array elements to REF over a total of four clock cycles (0, 1, . . . , 3), for each instruction sequence (0, 1, 2) an additional object code instruction is executed after the compare and to store history related to the comparison result—this additional instruction is identified herein as STORE_COMP_HIS, and it is executed by the STORE_COMP_HIS_EX stage 130. In the present example, and others described below, the history stores a hit/miss indicator of the comparison result. The hit/miss indicator may be stored in a temporary or dedicated storage location, such as in a one-bit HIS_FLAG register or value that is part of a larger bit quantity, which may be part of the FIG. 1 loop processing register 134. For example, in clock cycle 2, the STORE_COMP_HIS stores the hit/miss indicator for the instruction sequence 0, that is, for the COMPARE A[0], REF in the immediately preceding clock cycle 1. Similarly, in clock cycle 3, the STORE_COMP_HIS stores the hit/miss indicator for the instruction sequence 1 COMPARE A[1], REF in the immediately preceding clock cycle 2. Lastly, in clock cycle 4, the STORE_COMP_HIS stores the hit/miss indicator for the instruction sequence 2 COMPARE A[2], REF in the immediately preceding clock cycle 3.

Accordingly, multiple instances of STORE_COMP_HIS store and provide an aggregated history of successive comparisons, each relating to a different array element, and facilitating additional functionality described below.

The FIG. 2 instruction progression 200 also illustrates in clock cycle 5 that following a number of instruction sequences, which in the example provided are three such sequences (0, 1, 2), an additional LOOP DECISION instruction is executed by the LOOP DECISION_EX stage 132, with respect to the data loaded and compared in a group of preceding compares. In the example, the LOOP DECISION instruction processes the aggregated history information of sequences 0-2 (from multiple prior executions of STORE_COMP_HIS) to determine whether a comparison hit has occurred and, if so, at what array index location the hit occurred. The hit-location index may be stored in a temporary or dedicated storage location, such as in a HIT_INDEX register, which also may be part of the loop processing register 134. If no such hit has occurred, and as shown by additional examples below, the LOOP DECISION can direct that additional array elements may be processed. In contrast, if a hit has occurred, then the loop can conclude and branch to some other instruction(s) pertaining to functions other than the array search. Accordingly and as further demonstrated below, the aggregating loop history (STORE_COM- P_HIS) and processing of that history (LOOP DECISION) can significantly reduce loop overhead during array searching, as compared to the prior art.

Figure 3A:
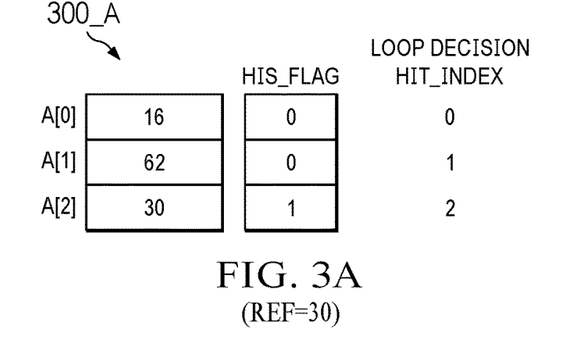
FIGS. 3A through 3C illustrate respective array searching examples using the FIG. 2 instruction progression, in search of an array value of 30.
Figure 3B:
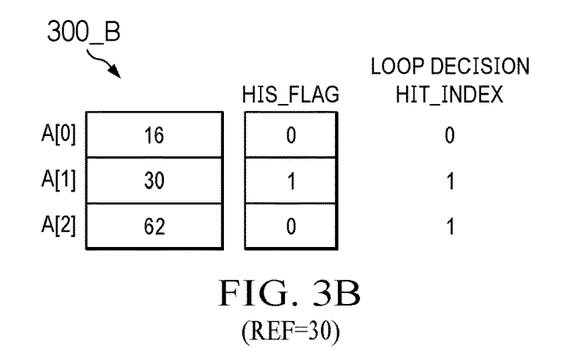
Figure 3C:
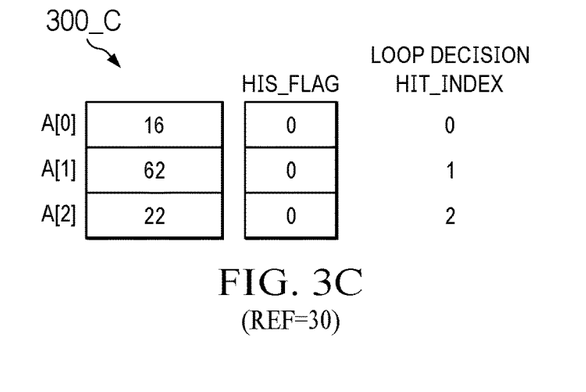

FIGS. 3A through 3C illustrate respective array searching examples, 300_A, 300_B, and 300_C, using the FIG. 2 instruction progression 200. Each of these Figures illustrates the first three ARRAY elements (indexed [0], [1], [2]), with examples of stored values and a reference search for a value of REF=30. Generally, in FIG. 3A, the hit (i.e., location of the value 30) occurs at A[2], in FIG. 3B the hit occurs at A[1], and in FIG. 3C there is no hit. Additional detail below is directed to the aggregated loop history and its processing.

For the example values in FIG. 3A and per the FIG. 2 progression, in clock cycle 0, A[0]=16 is loaded into a register, in clock cycle 1 that register value is compared to REF=30 generating a miss, and in clock cycle 2 the respective miss history is stored by HIS_FLAG, for example with HIS_FLAG=0 indicating the miss. Partially overlapping the above, in clock cycle 1, A[1]=62 is loaded into a register, in clock cycle 2 that register value is compared to REF=30 generating a miss, and in clock cycle 3 the respective miss history is stored by HIS_FLAG=0. Also partially overlapping the above, in clock cycle 2, A[2]=30 is loaded into a register, in clock cycle 3 that register value is compared to REF=30 generating a hit, and in clock cycle 4 the respective hit history is stored, for example with HIS_FLAG=1 indicating the hit (where of course complementary miss/hit values could be used for HIS_FLAG, as a one-bit value). In clock cycle 5, when the LOOP DECISION executes, the stored HIS_FLAGs are processed, and the HIT_INDEX location of the hit (at [2]) is identified; in an example, the identification may be implemented as a count, starting at a count of zero with the earliest HIS_FLAG in time and incrementing for each cleared flag thereafter, but incrementing and stopping once a hit (HIS_FLAG=1) is encountered. Note that only once a hit occurs is the HIT_INDEX value considered valid, as prior to that point it is essentially an increasing count of misses, rather than an identification of where a hit occurred. In FIG. 3A, for example, the count equals 0 for the HIS_FLAG=0 from clock cycle 2, increments to a count of 1 for the HIS_FLAG=0 from clock cycle 3, and increments but stops at a then-valid count of 2 for the HIS_FLAG=1 at clock cycle 4, meaning at that point the HIT_INDEX=2 correspondingly identifies that array element A[2] as the location where the comparison hit occurred. Further, such a count may be implemented by dedicated hardware or a value that advances (e.g., increments) in a storage location, either of which may be included in the loop processing register 134. Accordingly, by the completion of clock cycle 5, the LOOP DECISION determines a hit has occurred and the index [i=2] for that hit, after which the array search is complete. Additionally, note that the count is able to process multiple HIS_FLAGs in a single clock cycle, so that it may increment in a single clock cycle by a value more than just 1. For example in FIG. 3A, the count evaluates three such flags (corresponding to A[0], A[1], and A[2]), and can increment from 0 to 2 in a single clock cycle. Additional examples are provided below, with other potential increment values in a single cycle.

In FIG. 3B, again in clock cycle 0, A[0]=16 is loaded into a register, in clock cycle 1 that register value is compared to REF=30 generating a miss, and in clock cycle 2 the respective miss history is stored by HIS_FLAG=0. Partially overlapping the above, in clock cycle 1, A[1]=30 is loaded into a register, in clock cycle 2 that register value is compared to REF=30 generating a hit, and in clock cycle 3 the respective hit history is stored by HIS_FLAG=1. Also partially overlapping the above, in clock cycle 2, A[2]=62 is loaded into a register, in clock cycle 3 that register value is compared to REF=30 generating a miss, and in clock cycle 4 the respective miss history is stored by HIS_FLAG=0. In clock cycle 5, when the LOOP DECISION executes, the stored HIS_FLAGs are processed, and the HIT_INDEX of the hit (at [i=1]) is identified. Accordingly, while the hit is detected at clock cycle 2, at least one additional comparison occurs after that hit, in clock cycle 3, but the history of all comparisons is stored and evaluated after all three comparisons are complete. The index location of the hit again may be implemented as a count indicated as HIT_INDEX, starting with the earliest HIS_FLAG in time and continuing to increment with each flag while stopping and being valid once a set (HIS_FLAG=1) is encountered. In FIG. 3B, for example, the count equals 0 for the HIS_FLAG=0 from clock cycle 2, increments to 1 for the HIS_FLAG=1 from clock cycle 3 and stops, having encountered the first hit, with no change for any later-stored history information, including in this example the HIS_FLAG=0 from clock cycle 4. Accordingly, by the completion of clock cycle 5, the LOOP DECISION determines a hit has occurred at the index [i=1].

In FIG. 3C, the above-described process again applies generally, in which A[0]=16 is loaded into a register in clock cycle 0, generating a miss in clock cycle 1, and the miss is stored as HIS_FLAG=0 in clock cycle 2. Similarly, but delayed by one respective clock cycle, A[0]=62 loaded into a register in clock cycle 1, generating a miss in clock cycle 2, and the miss is stored as HIS_FLAG=0 in clock cycle 3, and with another one clock delay the same occurs for A[2]=22. Accordingly, in clock cycle 5, the LOOP DECISION evaluates the stored three HIS_FLAGs and determines, because each has a value of zero, that no hit has occurred. This determination will be indicated, for example, in the above-described counting approach for a count of zero. Specifically, the HIT_INDEX count equals 0 for the HIS_FLAG=0 from clock cycle 2, increments to 1 for the HIS_FLAG=0 from clock cycle 3 and increments once more to 2 for the HIS_FLAG=0 from clock cycle 4; however, because no hit has occurred, the HIT_INDEX value of 2 is invalid, in the sense that it does not at that point identify a location of an array hit, as a hit has not yet occurred. Accordingly, by the completion of clock cycle 5, the LOOP DECISION determines that no hit has occurred, for example based on all history flags being cleared, which thereby renders the HIT_INDEX value as invalid. However as shown in later examples, additional array search instructions may continue for a larger array, in which case the HIT_INDEX counter can continue to increment from its current (e.g., HIT_INDEX=2) value, if and until validated when a hit is detected.

Given the preceding, the FIG. 1 processor 100 by example, and the FIG. 2 instruction progression 200, provide a structure and method by which an array may be searched with at least one comparison per each of successive clock cycles. This may be contrasted to an alternative technique that does not load an element for a subsequent iteration until completion of the full set of steps for the prior iteration, including a load, compare, and result action taken on that prior iteration, in which case the delayed load for a subsequent iteration incurs additional clock cycles as compared to the processor 100. The described examples may considerably reduce loop overhead, particularly for larger arrays or where a hit occurs anywhere beyond the first few locations in the array, as the prior art has the tripling of clock cycles per array index and that tripling aggregates for each miss, whereas the described example can compare per clock cycle. Moreover and as further shown below, additional examples may be implemented, with additional scaling or parallelism, to achieve even greater performance and/or efficiency.

Figure 4:
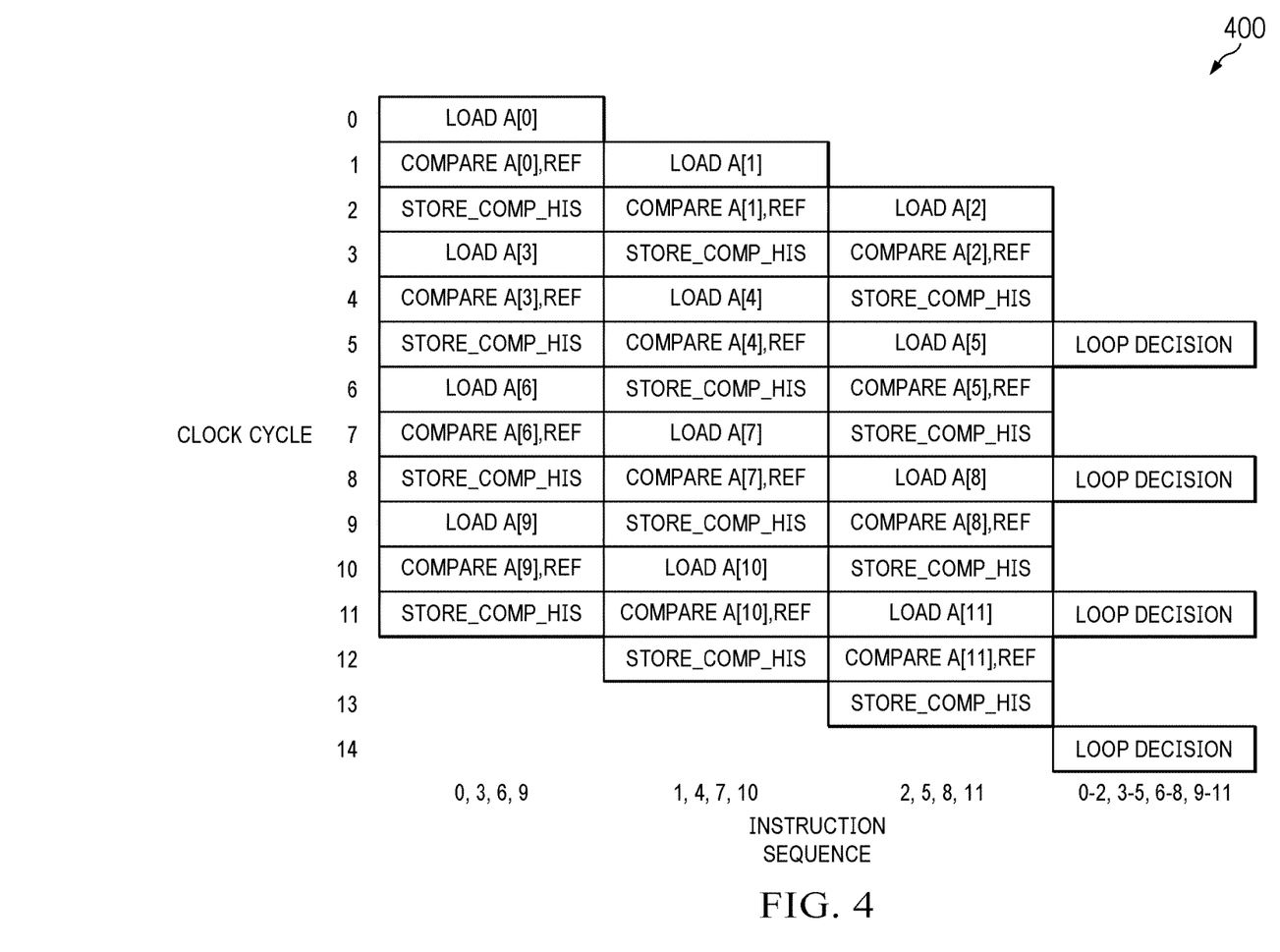
FIG. 4 illustrates expansion of the FIG. 2 instruction progression in a larger array and concurrent instructions across a larger number of clock cycles.

FIG. 4 illustrates an instruction progression 400, following the same axes convention and including the instruction progression 200 of FIG. 2. In FIG. 4, however, additional object code instructions are provided, for example demonstrating additional benefits of array searching in larger arrays and concurrent instructions across a larger number of clock cycles, as further considered in an example later, in connection with FIG. 5. For example, the FIG. 2 illustration and corresponding description demonstrated a LOOP DECISION in clock cycle 5; FIG. 4 adds, in that same clock cycle and preceding it, additional instruction sequences. For example, in clock cycle 3, FIG. 2 demonstrates the history store (STORE_COMP_HIS) for instruction sequence 1 and the reference comparison (COMPARE A[1], REF) for instruction sequence 2. While those two instructions are executing, FIG. 4 also adds a load (LOAD A[3]) for a next successive instruction sequence 3. As another example, in clock cycle 4, FIG. 2 demonstrates the history store (STORE_COMP_HIS) for instruction sequence 2; while that instruction is executing, FIG. 4 also adds a compare (COMPARE A[3], REF) for the next successive instruction sequence 3 and a load (LOAD A[4]) for a next successive instruction sequence 4. Accordingly, while FIG. 2 depicts a single execution of a LOOP DECISION in the clock cycle 5, the FIG. 4 depiction of the clock cycle 5 presents concurrently executing instructions, and a larger array, such that the LOOP DECISION of instruction sequences 0-2 occurs concurrently with the partial processing, in different stages, of three more instruction sequences (3, 4, and 5) all during the same clock cycle. If the LOOP DECISION in clock cycle 5 determines no hit has occurred in any of array elements A[0], A[1], or A[2] (akin to the FIG. 3C searching example, 300_C), then the array searching has already commenced with respect to additional array elements A[3], A[4], and A[5].

The above process continues for the entire instruction progression 400, either until the entire progression completes without a hit, or so long as a hit is not encountered and detected in a set of three array elements preceding a LOOP DECISION instance. For example, in clock cycle 8, another LOOP DECISION is executed, then processing the stored history for the array comparisons of array elements A[3], A[4], or A[5]. If a hit has occurred, it will be indicated by a HIS_FLAG=1, the index of that hit will be identified, and the instruction progression 400 can then branch elsewhere without executing some or all of the instructions shown after the clock cycle 8. Conversely, if no hit occurs, the instruction progression 400 continues through the clock cycle 11, at which point another LOOP DECISION is executed, then processing the stored history for the array comparisons of array elements A[6], A[7], or A[8], evaluating the stored history thereof and either detecting a hit and its corresponding index, or continuing again through the remaining clock cycles to clock cycle 14. Accordingly, in any of the preceding, a compare may be executed in successive clock cycles for numerous array elements, concluding if and when a hit is found in a set of such array elements, with the set size determined by the frequency of the LOOP DECISION. And, by the completion of clock cycle 14, a total of 12 array elements have been loaded, compared, and a potential hit among them detected, along with its index.

Figure 5:
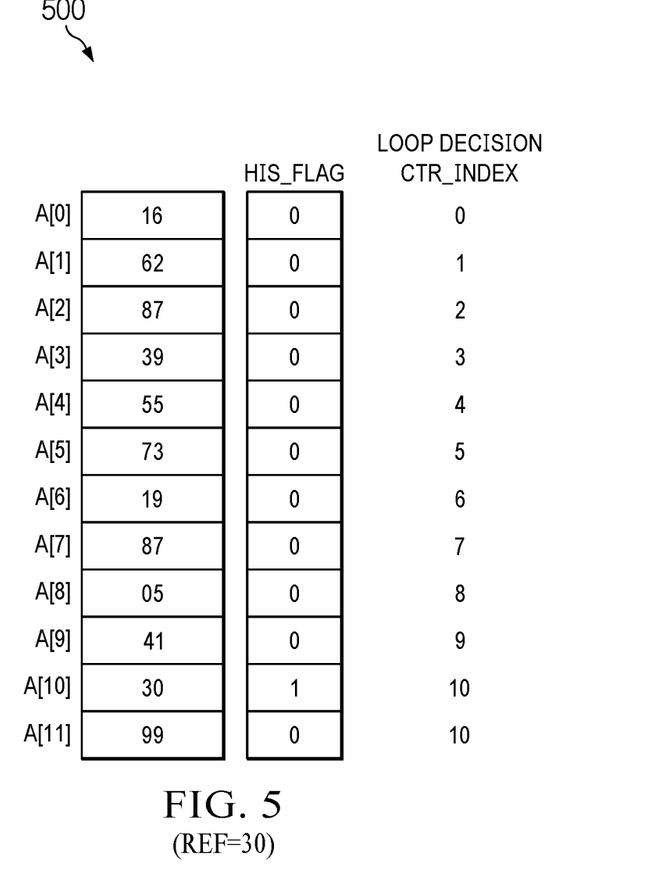
FIG. 5 illustrates a searching example using the FIG. 4 instruction progression, in search of an array value of 30.

FIG. 5 illustrates a searching example 500, using the FIG. 4 instruction progression 400, in search of an array value of 30. In its entirety, the searching example 500 includes twelve array elements (indexed [0], [1], . . . , [11]), where the instruction progression 400 executes a LOOP DECISION for successive sets of three array elements at a time, corresponding to three instruction sequences. Accordingly, across clock cycles 0 through 5, a first set of three array elements are loaded, compared to the reference REF, and the hit history, comprising the aggregate values of the HIS_FLAGs, is stored and then evaluated with a LOOP DECISION. In the illustrated example, that first set produces no hits, that is, the HIS_FLAG=0 for each respective comparison, and the LOOP DECISION, if implemented by a counter, increments for each HIS_FLAG=0, thereby up to a HIT_INDEX count of 2. Also during those clock cycles 0 through 5, namely in clock cycle 3, instruction processing of a second, successive set of three array elements commences, and concludes with an evaluating LOOP DECISION in clock cycle 8. In the illustrated example, that second set also produces no hits, so the flags for the no hits (misses) are stored with or appended to the flags from the first set, and the LOOP DECISION, if implemented by a counter, increments for each HIS_FLAG=0, thereby up to a HIT_INDEX count of 5. The same process continues for a third, successive set of three array elements, with the counter following clock cycle 11 at a count of 8, and then continues for a fourth, successive set of three array elements commences, concluding in clock cycle 14. In clock cycle 14, the LOOP DECISION increments the HIT_INDEX count from 8 to 9 due to the compare miss for array element A[9], and then increments the count from 9 to 10 and stops any additional increment, due to the compare hit for array element A[10], thereby validating the HIT_INDEX count at that point. Accordingly, of the 14 clock cycles in the instruction progression 400, a majority of those clock cycles include a successive compare following a compare in the immediately preceding clock cycle, thereby efficiently reducing loop overhead while performing the array search.

Figure 6:
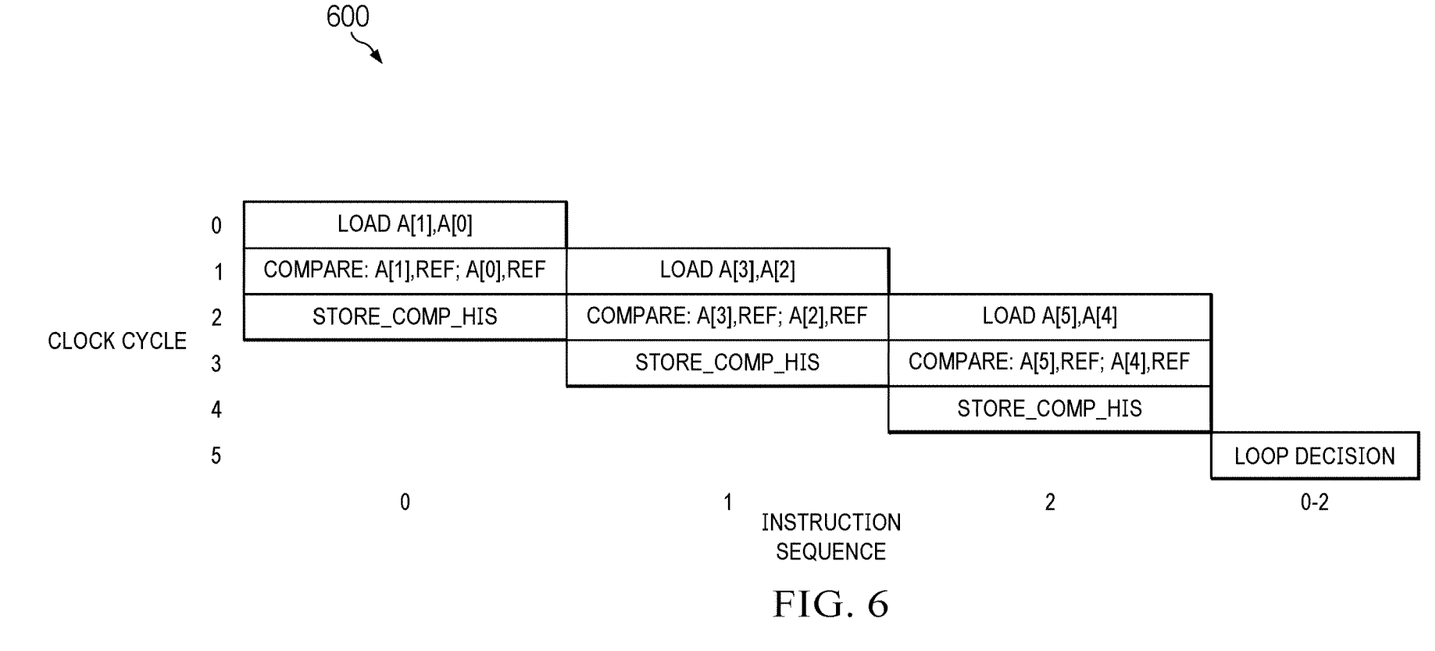
FIG. 6 illustrates an instruction progression with additional parallelism through concurrently operating with respect to two different array elements.

FIG. 6 illustrates an instruction progression 600, following the same axes convention and including the instruction progression 200 of FIG. 2. In FIG. 6, however, additional parallelism is provided in that each object code instruction concurrently operates with respect to two different array elements, as further considered in an example later, in connection with FIG. 7. This parallelism may be implemented, for example, in the structure and functionality of the appropriate stages of the FIG. 1 instruction pipeline 104, for example, where each of the LOAD, COMPARE, and STORE_COMP_HIS instructions having plural operands corresponding to respective plural array elements. For example, in clock cycle 0, the illustrated LOAD A[1], A[0] is intended to illustrate pipeline processing of that instruction such that, when executed, both array elements A[1] and A[0] are in the same clock cycle loaded into respective registers (or respective parts of a same register). Thereafter and as a next example, in clock cycle 1, the illustrated COMPARE: A[1], REF; A[0], REF is intended to illustrate a pipeline execution in which each of the array elements A[1] and A[0] is compared to REF in the same clock cycle. Thereafter and as a final example, in clock cycle 2, the STORE_COMP_HIS stores history for both of the compared array elements. For example, where earlier examples used a single bit for the HIS_FLAG, in the FIG. 6 example the HIS_FLAG may use two bits, one for each value compared in the same instruction sequence in the immediately preceding clock cycle; for reference as to such a multi-bit implementation, the flag may be represented as HIS_FLAG{mse, lse}, where the operand mse is the more significant position array element that was compared (A[1] in the current example), and the operand lse is the less significant position array element that was compared (A[0] in the current example). This convention is by way of example, as an alternative manner would be to consider/implement each bit as a separate flag (e.g., HIS_FLAG1 and HIS_FLAG2). After the history is stored, for example as shown in clock cycle 5, the LOOP DECISION evaluates those flags, consistent with prior descriptions, to determine whether a hit occurred and, if so, also to determine the index of that hit, as further shown by example below.

Figure 7:
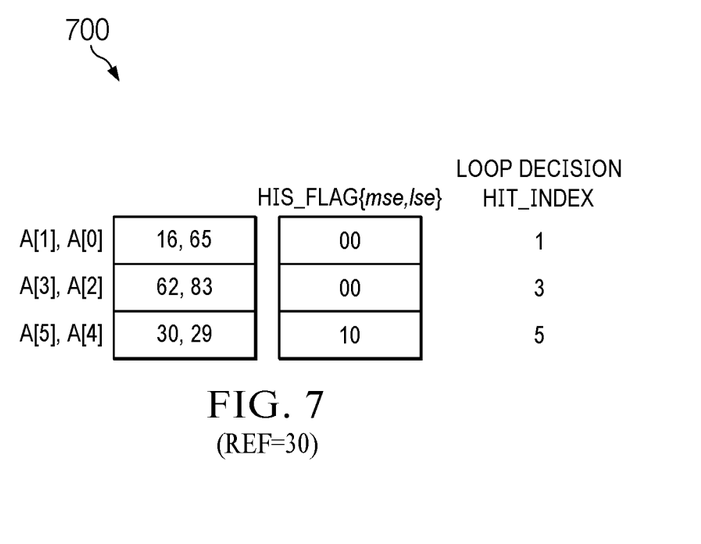
FIG. 7 illustrates an array searching example using the FIG. 6 instruction progression, in search of an array value of 30.

FIG. 7 illustrates an array searching example 700, using the FIG. 6 instruction progression 600 and again with the search of an array value of 30. In its entirety, the searching example 700 includes six array elements (indexed [0], [1], ..., [5]). However, with the FIG. 6 parallelism, two array elements are processed at a time. For example, in clock cycle 0, A[1]=16 and A[0]=65 are loaded, then in clock cycle 1, each loaded element is compared to REF=30, and then in clock cycle 2, the match history for each is stored. In the illustrated example, both cycle 1 comparisons yield a miss, so clock cycle 2 stores HIS_FLAG{A[1], A[0]}=00. Partially overlapping the clock cycles processing A[1] and A[0], in clock cycle 1, A[3]=62 and A[2]=83 are loaded, then in clock cycle 2, each loaded array element is compared to REF=30, and then in clock cycle 3 the match history for each is stored (so the flags are stored with or appended to the flags from the clock cycle 2), which for these example values yield two respective misses, so clock cycle 3 stores HIS_FLAG{A[3], A[2]}=00. Partially overlapping the clock cycles processing A[3] and A[2], in clock cycle 2, A[5]=30 and A[4]=29 are loaded, in clock cycle 3 each is compared to REF=30, and in clock cycle 3 the match history for each is stored (so the flags are stored with or appended to the flags from the clock cycle 3), which for these example values yields one respective hit and one respective miss, so clock cycle 4 stores HIS_FLAG{A[5], A[4]}=10. Lastly, in clock cycle 5, the LOOP DECISION determines a hit has occurred and identifies the index [i=5], again using the counter example for hit index detection, starting with the earliest HIS_FLAG in time (least significant ordered) and incrementing but stopping at a then-validated count once a set (HIS_FLAG=1) is encountered.

Figure 8:
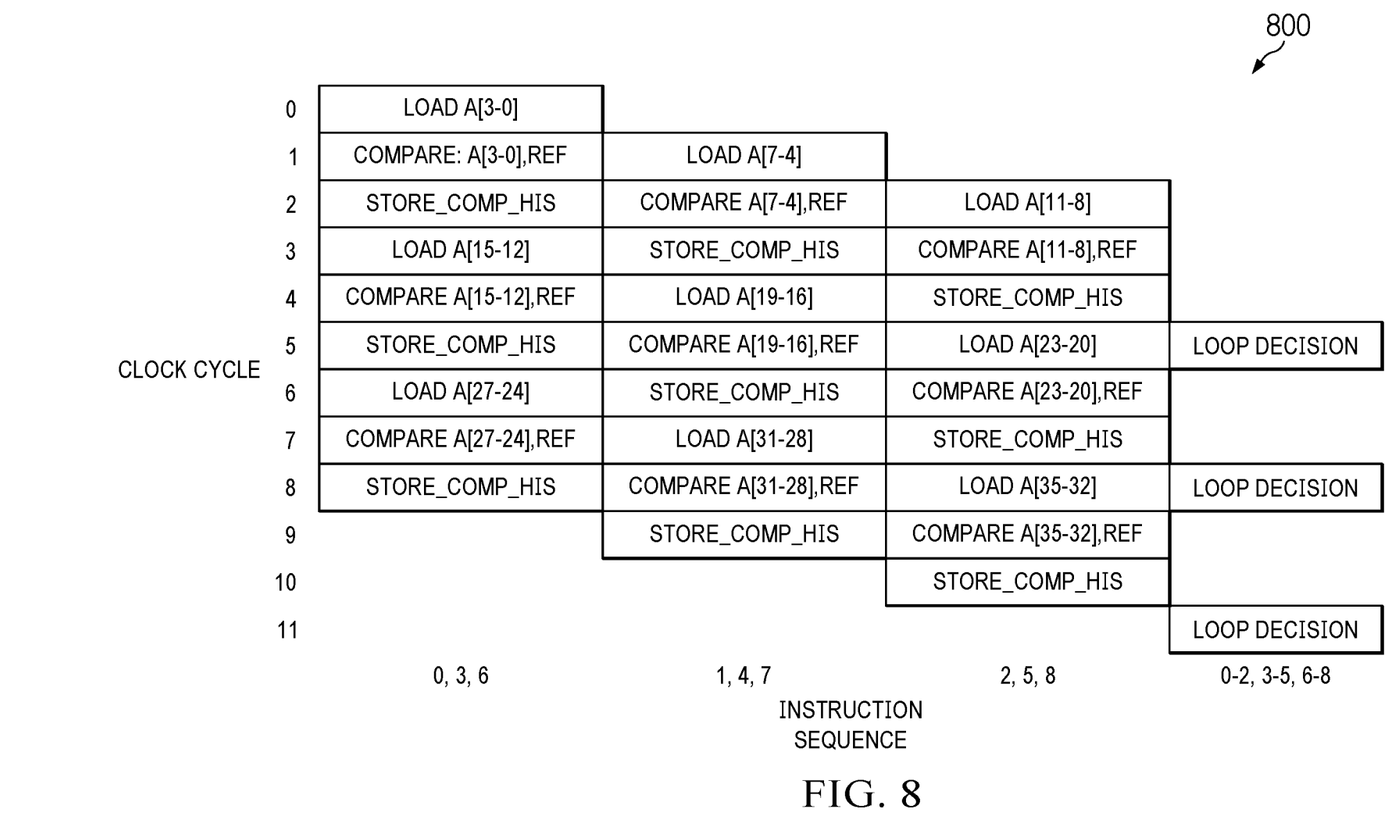
FIG. 8 illustrates an instruction progression with instructions concurrently directed to four different array elements.

FIG. 8 illustrates an instruction progression 800, following the same axes convention as in FIGS. 2, 4, and 6. In FIG. 8, however, object code instructions are provided over additional clock cycles, and each instruction (and instruction sequence) is directed to four different array elements thereby further expanding capacity, for example as compared to the single array element instructions in FIGS. 2 and 4, or the dual array element instructions in FIG. 6. The additional element capacity also may be implemented in the structure and functionality of the appropriate stages of the FIG. 1 instruction pipeline 104. For example, for a first instruction sequence, in clock cycle 0, the LOAD A[3-0] illustrates pipeline processing that, when executed, loads all four array elements A[3], A[2], A[1], and A[0] into respective registers (or respective parts of a same register) in the same clock cycle. Thereafter and as a next example, in clock cycle 1, the COMPARE: A[3-0], REF illustrates pipeline processing that compares REF to each of the four loaded array elements A[3], A[2], A[1], and A[0], in the same clock cycle. Thereafter and as a final example, in clock cycle 2, the STORE_COMP_HIS stores history for all four of the compared array elements, so a total of four bits are stored, which as described above may be contiguous bits stored in order of positional significance or as four separate flags. Further, overlapping in part with the above steps taken with respect to a first set of four array elements, in clock cycle 1 a comparable set of steps are taken with respect to a second set of four array elements, and this process is repeated in FIG. 8 for a total of nine instruction sequences, processing nine sets, each with four array elements. Also occasionally, for example in fixed periods starting at clock cycle 5 and repeating every three clock cycles, a LOOP DECISION is executed for the history pertaining to the 12 array elements previously loaded, compared to REF, and for which hit/miss history was stored. For example, in clock cycle 5, the LOOP DECISION evaluates the flags corresponding to the array elements A[0] through A[11], while in clock cycle 8 the LOOP DECISION evaluates the flags corresponding to the array elements A[12] through A[23], and lastly in clock cycle 11, the LOOP DECISION evaluates the flags corresponding to the array elements A[24] through A[35]. Again, each LOOP DECISION can end (branch away from) the search if a hit is found in the array elements that were processed preceding the LOOP DECISION, and consistent with preceding descriptions, determine the index of that hit, if one is eventually located, as further shown by example below.

Figure 9:
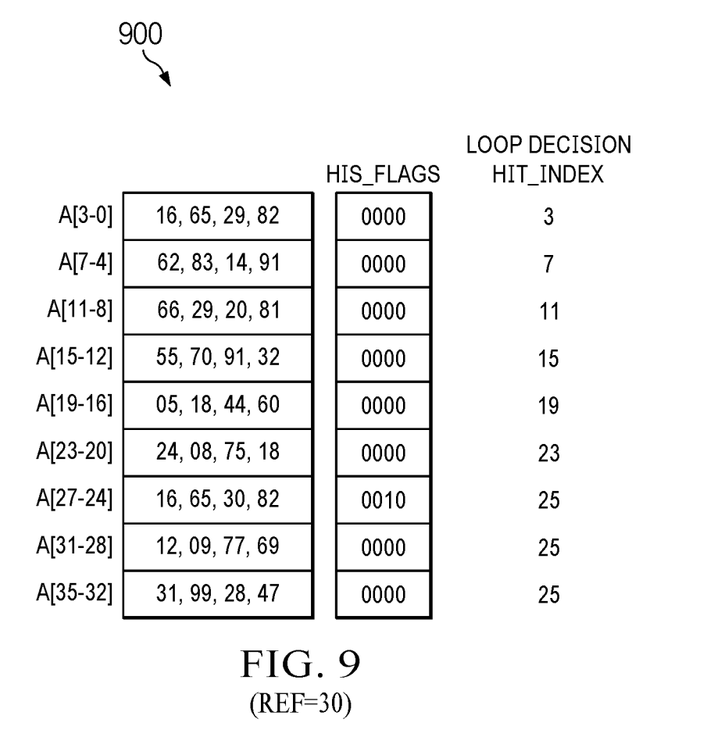
FIG. 9 illustrates a searching example using the FIG. 8 instruction progression in search of an array value of 30.

FIG. 9 illustrates a searching example 900, using the FIG. 8 instruction progression 800, in search of an array value of 30. In its entirety, the searching example 900 includes thirty-six array elements (indexed [0], [1], ..., [35]), where the instruction progression 800 executes a LOOP DECISION for successive sets of twelve elements at a time, corresponding to three instruction sequences, and where each instruction sequence involves four different array elements. Accordingly, across clock cycles 0 through 5, a first set of 12 array elements are loaded, compared to the reference REF, and the hit history is stored and then evaluated with a LOOP DECISION. In the illustrated example, that first set produces no hits, that is, the HIS_FLAG=0 for each respective comparison (shown collectively from index [3] to index [0] as 0000), and the LOOP DECISION, if implemented by a counter, increments for each HIS_FLAG=0, thereby up to a value of 11. Also during those clock cycles 0 through 5, namely in clock cycle 3, instruction processing of a second, successive set of 12 array elements commences, and concludes with an evaluating LOOP DECISION in clock cycle 8. In the illustrated example, that second set also produces no hits, and the LOOP DECISION, if implemented by a counter, increments for each HIS_FLAG=0, thereby up to a value of 23. The same process continues for a third, successive set of 12 array elements. However, when the LOOP DECISION executes in clock cycle 11, a hit is detected in the third set of 12 array elements, namely, at an index of 25, which is the count value as that count incremented from 23 after the clock cycle 8 LOOP DECISION for the next most significant no-hit value of HIS_FLAG corresponding to A[24]=82 followed by the next most significant hit value of HIS_FLAG corresponding to A[25]=30. Accordingly, of the 11 clock cycles in the instruction progression 700, a total of 32 array values are evaluated for a hit/miss, again efficiently reducing loop overhead while performing the array search.

Figure 10:
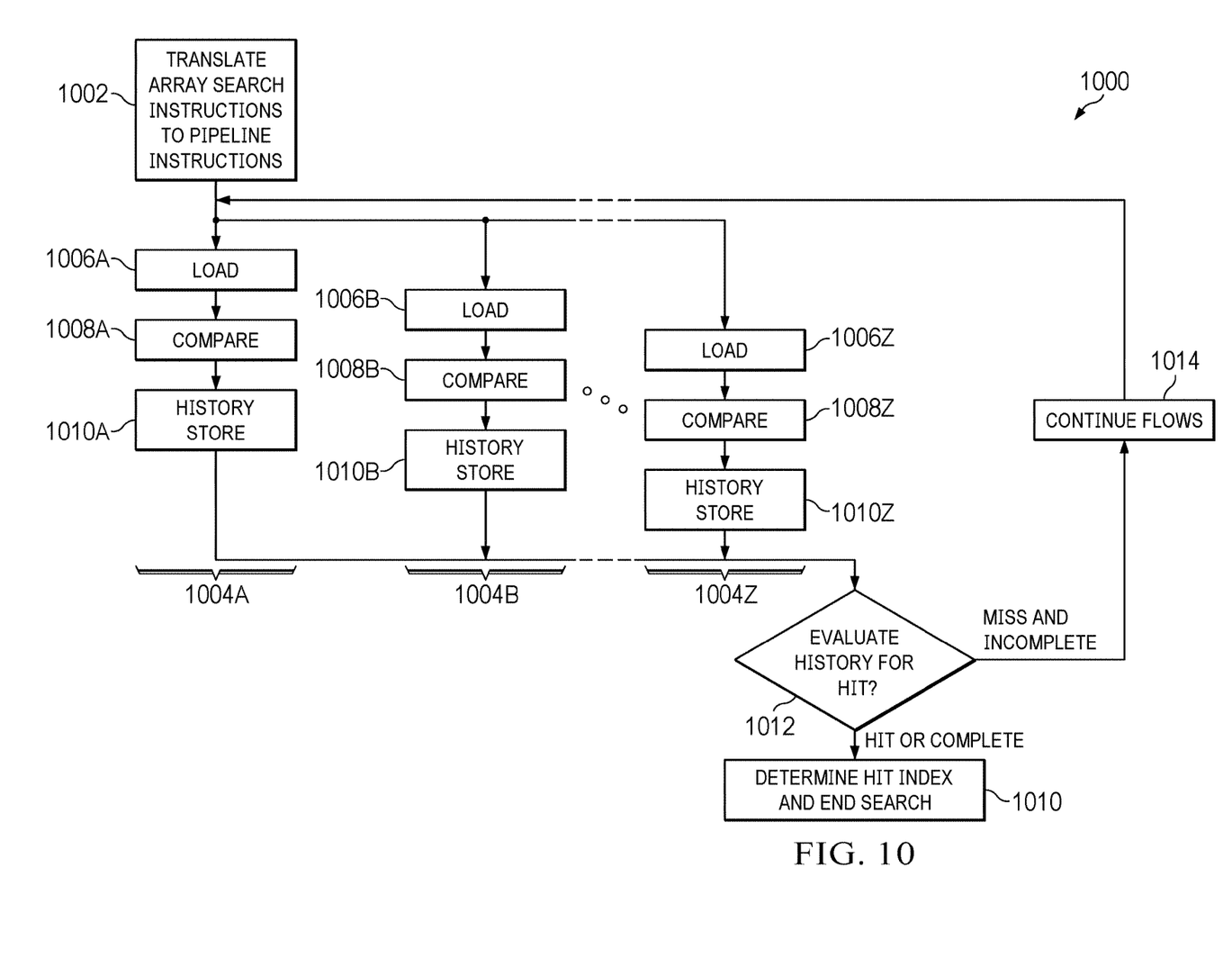
FIG. 10 is a flowchart of an example array searching method.

FIG. 10 is a flowchart of an example array searching method 1000, consistent with and summarizing certain principles described above. In the array searching method 1000, a step 1002 translates (e.g., compiles) an array search, for example indicated in higher level computing language, to object code instructions to be processed in a processor pipeline. The object code instructions provide multiple concurrent flows 1004A, 1004B, ..., 1004Z, where previous described examples described three such concurrent flows, and the object code instructions further include a loop decision following execution of a set of the flows. Each of the multiple concurrent flows has a same set of steps and operates concurrently, with each flow time shifted relative to the others, and are processed through the processor pipeline. For example, a first flow 1104A includes a load 1006A of one or more array elements, followed by a comparison 1008A of the loaded element(s) to a search reference value, followed by a history store 1010A of the comparison result(s). Meanwhile, the second flow 1104B has the same steps, but occurring to partially overlap yet start and finish later in time relative to the first flow 1104A, for example with a load 1106B that occurs concurrently with the first flow 1104A compare 1108A, and a compare 1008B that occurs concurrently with the first flow 1004A history save 1010A. Lastly, the second flow also has a history store 1010B, following its compare 1008B and also after the completion of the first flow 1004A history store 1010A. The same pattern and time delay will repeat for any additional flows, such as flow 1004Z. Additionally, at some point following the completion of the set of steps of the first flow 1004A, a conditional step 1012 evaluates the history for a plural number of the flows, where that history represents an aggregation at that point in time of a number of array elements that have been compared to the reference value, with the comparison results having been stored as the aggregate comparison history. If the conditional step 1012 determines that the aggregate comparison history reveals only comparison misses and the array is not yet fully searched, then the conditional step 1012 directs control to a continuation step 1014, thereby providing control to the multiple flows 1004A, 1004B, . . . , 1004Z so that each continues to loop and process an additional array element or elements. Conversely, if the conditional step 1012 determines that the aggregate comparison history reveals either a hit from a comparison or that the array is fully searched, it directs control to a completion step 1016, in which, if a hit was detected, the index of the first array element to hit in a comparison is determined, and the method 1000 also completes without any additional processing by any of the multiple flows 1004A, 1004B, . . . , 1004Z.

From the above, described examples provide an electronic processor structure and method that reduces overheard in processor array searching. An example processor includes a pipeline with stages, which in different examples may operate with respect to one or more array elements. Array searching instructions, for example from a higher level computing language, are translated to machine level instructions that include certain steps that can reduce, even significantly, the overhead in a pipeline architecture that performs array searching. Numerous examples are provided and also provide teaching from which others may be ascertained. Accordingly, additional modifications are possible in the described embodiments, and other embodiments are possible, within the scope of the following claims.

What is claimed is:

1. A processor, comprising:
    an instruction pipeline configured to execute a processor instruction to search for a reference value in an array that includes a plurality of array elements;
    wherein the instruction pipeline includes a load stage circuit, a compare stage circuit, a store stage circuit, and a loop hit detect stage circuit, and
    wherein to execute the processor instruction,
        the load stage circuit is configured to load a first set of multiple array elements of the plurality of array elements during a first clock cycle;
        the compare stage circuit is configured to compare each of the first set of multiple array elements to the reference value to generate a first value indicating respective comparison results of the first set of multiple array elements;
        the store stage circuit is configured to store the first value; and
        the loop hit detect stage circuit is configured to determine whether any of the first set of multiple array elements matches the reference value based on the stored first value.

2. The processor of claim 1, wherein to determine whether any of the first set of multiple array elements matches the reference value, the loop hit detect stage circuit is further configured to:
    advance a count value according to clock cycles; and
    stop advancing the count value in response to determining that one array element of the first set of multiple array elements matches the reference value based on the stored first value.

3. The processor of claim 2, wherein the loop hit detect stage circuit is further configured to determine an index of the array element that matches the reference value based on the count value.

4. The processor of claim 1, wherein the first value is a N-bit binary value, and N equals the number of array elements in the first set of multiple array elements, and wherein each bit of the N-bit binary value corresponds to a respective one array element of the first set of multiple array elements.

5. The processor of claim 4, wherein for each of the first set of multiple array elements, the compare stage circuit is configured to:
    set one bit of the N-bit binary value to 1 to indicate that the corresponding array element matches the reference value; or
    set the bit to 0 to indicate that the corresponding array element does not match the reference value.

6. The processor of claim 1, wherein the compare stage circuit is configured to compare each of the first set of multiple array elements to the reference value during a second clock cycle that is subsequent to the first clock cycle.

7. The processor of claim 6, wherein the store stage circuit is configured to store the first value during a third clock cycle that is subsequent to the second clock cycle.

8. The processor of claim 1, wherein the first set of multiple array elements includes two array elements.

9. The processor of claim 1, wherein the first set of multiple array elements includes four array elements.

10. The processor of claim 6, wherein the load stage circuit is configured to load a second set of multiple array elements of the plurality of array elements during the second clock cycle.

11. The processor of claim 10, wherein the compare stage circuit is configured to compare each of the second set of multiple array elements to the reference value to generate a second value indicating respective comparison results of the second set of multiple array elements during a third clock cycle that is subsequent to the second clock cycle.

12. The processor of claim 11, wherein the store stage circuit is configured to store the second value during a fourth clock cycle that is subsequent to the third clock cycle.

13. The processor of claim 12, wherein to determine whether any of the first set of multiple array elements matches the reference value, the loop hit detect stage circuit is configured to aggregately determine whether any of the first and second sets of multiple array elements matches the reference value based on the stored first and second values.

14. A processor, comprising:
an instruction fetch stage circuit configured to fetch an instruction requiring to search for a reference value in an array that includes a plurality of array elements; and
an execute stage circuit coupled to the instruction fetch stage circuit and configured to execute the fetched instruction,
wherein to execute the fetched instruction, the execute stage circuit is configured to:
load multiple array elements of the plurality of array elements during a first clock cycle;
compare each of the multiple array elements to the reference value to generate a value indicating respective comparison results of the multiple array elements;
store the value; and
determine whether any of the multiple array elements matches the reference value based on the stored value.

15. The processor of claim 14, wherein to determine whether any of the multiple array elements matches the reference value, the execute stage circuit is further configured to:
advance a count value corresponding to generation of the value; and
stop advancing the count value in response to determining that one array element of the multiple array elements matches the reference value based on the stored value.

16. The processor of claim 15, wherein the execute stage circuit is further configured to determine an index of the array element that matches the reference value based on the count value.

17. The processor of claim 14, wherein the value is a N-bit binary value, and N equals the number of array elements in the multiple array elements, and wherein each bit of the N-bit binary value corresponds to a respective one array element of the multiple array elements.

18. The processor of claim 14, wherein the multiple array elements include two or four array elements.

19. A method, comprising:
loading multiple array elements of an array to an instruction pipeline of a processor during a first clock cycle;
comparing each of the multiple array elements to a reference value to generate a value indicating respective comparison results of the multiple array elements during a second clock cycle;
loading the value to a register during a third clock cycle; and
determine whether any of the multiple array elements matches the reference value based on the loaded value.

20. The method of claim 19, further comprising:
advancing a count value corresponding to generation of the value;
stopping advancement of the count value in response to determining that one array element of the multiple array elements matches the reference value based on the loaded value; and
determining an index of the array element that matches the reference value based on the count value.

* * * * *